Jan. 5, 1943.　　　　　G. S. DUNHAM　　　　　2,307,672
FUME DISPOSAL IN CATALYST REGENERATION SYSTEMS
Filed Oct. 1, 1938
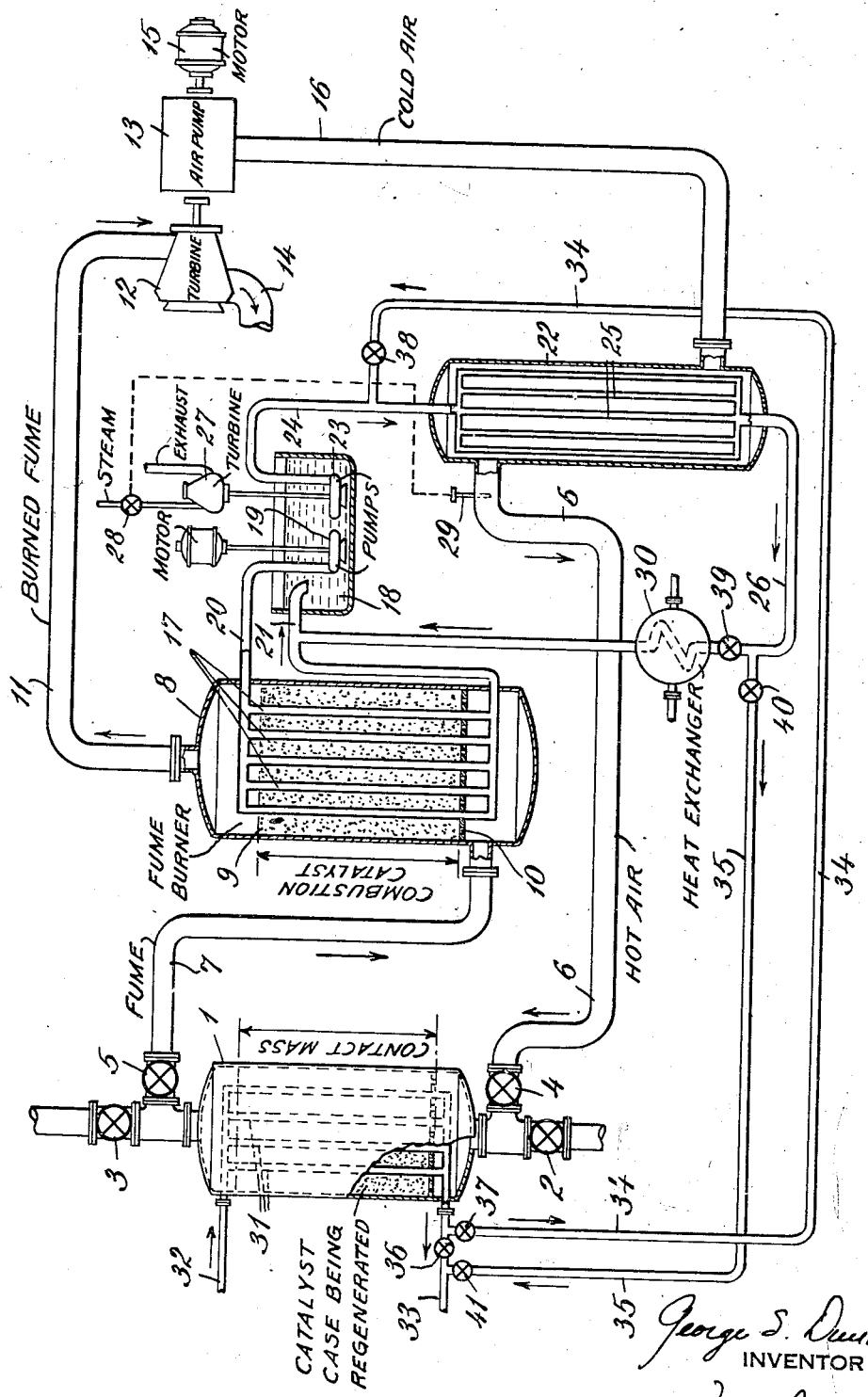

Patented Jan. 5, 1943

2,307,672

UNITED STATES PATENT OFFICE 2,307,672

FUME DISPOSAL IN CATALYST REGENERATION SYSTEMS

George S. Dunham, Ardmore, Pa., assignor to Socony-Vacuum Oil Company, Incorporated, New York, N. Y., a corporation of New York Application October 1, 1938, Serial No. 232,733

1 Claim. (Cl. 23—288)

This invention has to do with the problem of disposal and utilization of "fume" from the regeneration, by combustion, of spent contact masses.

Known processes for the conversion of hydrocarbons consist of passing the hydrocarbons, in vapor form, at reaction or conversion temperatures through a contact mass capable of catalyzing the desired conversion. The desired reaction occurs in the presence of the contact mass and is accompanied by the deposit on and in the contact mass of a combustible material of carbonaceous nature. After a period of time, the carbonaceous deposit builds up sufficiently to impair the activity of the catalytic contact mass, and it must be removed. The usual method of removal is by a regeneration in situ of the contact mass, accomplished by passing a combustion supporting gas, such as air, through the contact mass, and burning off the deposit. The "fume" or exit gases from such a regeneration are odorous, and, because of the presence of hydrocarbons, etc., volatilized from the mass, but principally because of the presence of considerable carbon monoxide, are still combustible. This invention is specifically concerned with the problem of disposal and utilization of such "fume."

The principal object of this invention is the provision of a process whereby such waste gases from regeneration may be disposed of conveniently, under efficient control, and in which a proper utilization and recovery of energy otherwise wasted is possible. A further principal object is the provision of apparatus wherein the disclosed process may be accomplished. Other objects are in part obvious or may be mentioned hereinafter.

To facilitate understanding of the invention, reference is made to the drawing attached to this specification, the single figure of which is a diagrammatic representation of apparatus sufficient for accomplishment of the process.

In the drawing 1 represents a catalyst case containing contact mass which has been contaminated as hereinbefore described, and which is being regenerated. It is to be understood that the catalyst case 1 has no part in the present process other than being the source of the "fume." It is also to be understood that this catalyst case 1 is merely representative of any catalyst case, being regenerated after any process, wherein a contact mass has been contaminated by a carbonaceous deposit and which is being regenerated by blowing a combustion supporting gas, such as air, therethrough to burn off the contaminant.

Catalyst case 1 is equipped with valves 2 and 3 for the entrance and exit, respectively, of hydrocarbons during reaction, and with valves 4 and 5 for the entrance and exit, respectively, of regeneration medium during regeneration. During the operation here discussed, valves 2 and 3 are closed, 4 and 5 being open, regeneration medium, in this case air, is supplied by pipe 6 and the flue gas or "fume" from regeneration is removed through pipe 7. To maintain regenerative combustion at an efficient level, it is necessary to preheat the air entering through pipe 6. In the prior art over which this invention is an improvement, this preheating is accomplished by passing the incoming air through tubes in a separately fired furnace or stove. The "fume" leaving through pipe 7 contains a substantial quantity of carbon monoxide, some hydrocarbon volatilized from the contaminant in 1, and a substantial amount of unconsumed oxygen. Under proper conditions it is still combustible, or may be made so by the introduction of some air. It is also odorous. These considerations require further treatment before discharge to atmosphere, and it is customary to effect such treatment by leading the gases or "fume" from pipe 7 through a combustion case 8 containing a combustion catalyst 9, supported by a grid 10. The combustible fume further burns in case 8 by a process of surface combustion or the like within the interstices of the combustion catalyst 9, which may take any form appropriate for the reaction but is conveniently composed of small pellets or granules of a clay-like nature impregnated or mixed with an oxidation promoter, such as, for example, copper oxide.

Treated "fume" departs from case 8 through pipe 11, and it is further customary to recover at least a portion of the energy present in these high temperature gases by allowing them to expand through gas turbine 12, driving air pump 13, before their exit to the atmosphere via pipe 14. Air pump 13, which has as an auxiliary drive the electric motor 15 is used to compress air for regeneration which is discharged through pipe 16. The unburned fume entering case 8 has a temperature of about 850° F. minimum, and may be higher. After the highly exothermic burning in case 8, its temperature, in the absence of correction, may be quite high. The gas turbine 12 should not be exposed to temperatures of greater than about 950° F. and consequently it is customary to bring the temperature of the gases in pipe 11 below this by admixing cold air or by spraying in water at some point along pipe 11. Also, the combustion catalyst in case 8 is usually adversely affected by temperatures of the order of 1100–1200° F. and to remain safely below such temperatures it is usually necessary to conduct the reaction in case 8 at a rate slower than that which would otherwise be possible.

To this process and structure of the prior art I have made certain additions and alterations.

For control of the temperature in case 8 I have arranged therein a series of tubes 17 and circulate a fluid heat exchange medium in such tubes. The arrangement of these tubes is such that every particle of contact mass in case 8 is in effective indirect heat exchange relationship with the heat exchange medium, so that contact mass temperature may be controlled accurately and sufficient heat extracted to prevent damage to the contact mass while permitting the burning to take place at a maximum rate. This control serves also to control the temperature of the gases leaving through pipe 11 without wasteful loss by the heating of an extraneous medium such as cold air or sprayed water. The heat exchange medium in pipe 17 originates in hot well 18, from whence it is pumped by pump 19 through pipe 20 and to which it returns by pipe 21.

To effectively utilize the heat thus removed from case 8 there is provided a heat exchanger 22 into which fresh air for regeneration flows from pipe 16 and from which the heated regeneration air is passed to pipe 6. For heating this air, pump 23 picks up hot heat exchange medium from hot well 18, delivering it through pipe 24 to tubes 25 in heat exchanger 22. The heat exchange medium is returned to hot well 18 by pipe 26. To control the degree of heating of the air, the pump 23 is provided with a variable speed drive, such as a steam turbine 27 controlled by a valve 28, which valve 28 is opened or closed responsive to the temperature in pipe 6 observed by thermocouple 29, in known manner.

In case the heat removed from case 8 is in excess of the heat taken up in preheating regeneration air, as is frequently the case, an additional heat removal means is provided by heat exchanger 30, installed in pipe 26. Heat exchanger 30 may be used to heat water, to heat oil for the conversion or for some other process, or may take the form of a waste heat boiler. If preferred, heat exchanger 30 may be installed in pipe 20.

In most forms of conversion catalyst cases, such as case 1, some provision is made for control of regeneration temperature and removal of heat by means of a heat exchange medium circulated in coil 31 placed in case 1, these coils being fed heat exchange medium through pipe 32, which is removed through pipe 33. In such installations, the pipes 34 and 35 may be provided, as well as valves 36, 37, 38, 39, 40, 41 in order that this heat exchange medium may also be used for regeneration air heating, for example during emergencies, or when the heat supply from case 8 is insufficient for air heating.

The heat exchange medium utilized herein should be one possessed of low viscosity, low vapor pressure and high specific heat at the temperature encountered, viz. 600° F. to 1200° F. Low melting point metals and alloys and fused mixtures of inorganic salts may be used. Of these, the fused mixtures of inorganic salts are best, and an exemplary medium is a fused mixture of alkali salts of the oxy-acid of nitrogen.

It may be seen that this operation provides for complete control of the temperatures within case 8 and pipe 11 and at the same time effectively provides for utilization of the energy developed in the fume and during fume disposal. It completely obviates former sources of loss and poor control, and also does away with the necessity of maintaining a separate combustion in a separate stove or furnace for the preheating of regeneration medium.

As an example of operation according to this process and of the conditions encountered, the following may be cited.

The conversion case 1, having previously contaminated in a vapor phase cracking operation, wherein hydrocarbon vapors were passed through case 1 at a temperature of 875° F. for a period of twenty minutes, during which there was deposited upon the contact mass in case 1 about 2% of its weight of carbonaceous material, is now being regenerated. This regeneration is being accomplished by passing in air through pipe 6, preheated to about 850° F. at such a rate that the 2% of carbon will be removed during a period of about twenty minutes. The temperature of the contact mass in case 1 is controlled by circulating heat exchange medium at a temperature of about 875° F. through coils 31. In this case no heat exchange medium from case 1 passes through pipes 34 and 35. Fume leaving case 1 through pipe 7 is at a temperature of 875° F. to 900° F., and in passing through case 8 undergoes further combustion. Sufficient heat exchange medium is circulated through pipes 17 in case 8 to remove therefrom the heat of this combustion, the exit gases in pipe 11 being held to about 925° F. and the heat exchange medium being held within a temperature range of about 850–925° F. Sufficient heat exchange medium is circulated through heat exchanger 22 to bring the regeneration air to about 850° F., excess heat being removed from the system by heat exchanger 30.

In case only one or two catalyst cases such as 1 are operated in conjunction with a fume combustion case 8 the intensity of combustion in 8 will vary with the cycle, being highest when the fumes entering 8 are coming from a catalyst case 1 in the first state of regeneration. In such event, even though the amount of heat removed from case 8 per unit of time varies, the system disclosed is capable of effective action to maintain the desirable temperatures indicated.

It is to be understood that specific data set forth herein is given solely for purposes of illustration and that the invention is not limited thereto or thereby, but only by such limitations as are set forth in the appended claim.

I claim:

In an apparatus for catalytic conversion of hydrocarbon oils by contact with a solid adsorptive catalyst at elevated temperature followed by regeneration of the catalyst by burning carbonaceous deposits therefrom with an oxidizing gas, said apparatus including a conversion chamber, a bed of said adsorptive catalyst in said conversion chamber, a first heat exchanger within said conversion chamber for conducting a heat exchange fluid in indirect heat exchange relation with said bed of adsorptive catalyst, means to supply said fluid to said first heat exchanger, means to withdraw said fluid from said first heat exchanger, means to flow oxidizing gas into said conversion chamber, a preheater for heating said gas supplied to said last-named means, a combustion chamber, a bed of combustion catalyst in said combustion chamber capable of inducing oxidation of combustible gases, means for conducting regeneration fume from said conversion chamber to and through said combustion chamber; the improvement which comprises a second heat exchanger in said combustion chamber, inlet means to supply a heat exchange fluid to said second heat exchanger, outlet means to exhaust said fluid from said second heat exchanger, a third heat exchanger in said preheater, means to conduct fluid from said outlet means to said third heat exchanger, a conduit to withdraw fluid from said third heat exchanger, valved means for conducting fluid from said conduit to said outlet means of said second heat exchanger to mingle with fluid therein, a valve in said means to withdraw fluid from said first heat exchanger, valved means to conduct fluid from said conduit to said means to withdraw fluid from said first heat exchanger at a point therein on the side of said valve remote from said first heat exchanger, means to conduct fluid to the inlet of said third heat exchanger from a point in said means to withdraw fluid from said first heat exchanger at a point therein intermediate said valve and said first heat exchanger and valves to control flow in said last two defined means.

GEORGE S. DUNHAM.